United States Patent [19]

Schlichenmaier et al.

[11] Patent Number: 5,717,134
[45] Date of Patent: Feb. 10, 1998

[54] PROCESS AND DEVICE FOR TESTING THE FUNCTION OF AN ELECTRONICALLY CONTROLLING BRAKE SYSTEM

[75] Inventors: Andreas Schlichenmaier, Zaberfeld; Juergen Wrede, Bietigheim-Bissingen, both of Germany

[73] Assignee: Robert Bosch GmbH, Stuttgart, Germany

[21] Appl. No.: 595,289

[22] Filed: Feb. 1, 1996

[30] Foreign Application Priority Data

Feb. 23, 1995 [DE] Germany ............ 195 06 288.4

[51] Int. Cl.⁶ .................................................. B60T 17/22
[52] U.S. Cl. .................. 73/121; 340/453; 364/426.01
[58] Field of Search ............................. 73/121, 123, 126, 73/129, 130, 117; 340/453, 454

[56] References Cited

U.S. PATENT DOCUMENTS

| 3,622,977 | 11/1971 | Wakamatsu | 340/453 |
| 3,965,732 | 6/1976 | Cline | 73/126 |
| 4,083,032 | 4/1978 | Nakamura et al. | 340/453 |
| 5,265,468 | 11/1993 | Holst et al. | 73/118.1 |

FOREIGN PATENT DOCUMENTS

| 0555532 | of 1993 | European Pat. Off. |
| 3416744 | of 1985 | Germany |
| 3839948 | of 1989 | Germany |
| 3829949 | of 1990 | Germany |
| 3901270 | of 1990 | Germany |
| 4030980 | of 1992 | Germany |
| 2241123 | of 1991 | United Kingdom |
| 2260174 | of 1993 | United Kingdom |
| 2270130 | of 1994 | United Kingdom |

OTHER PUBLICATIONS

Wrede et al., "Elektronisch geregelte Druckluftbremsanlage für Nutzfahrzeuge" Fisita 1992.

Primary Examiner—George M. Dombroske
Attorney, Agent, or Firm—Felfe & Lynch

[57] ABSTRACT

An operating variable detected by at least two control units for actuating the brakes is distributed to a central control unit which identifies an error state in the area of the control unit in question when the operating variable in question deviates unacceptably from a reference value.

16 Claims, 2 Drawing Sheets

PROCESS AND DEVICE FOR TESTING THE FUNCTION OF AN ELECTRONICALLY CONTROLLING BRAKE SYSTEM

BACKGROUND OF THE INVENTION

The invention pertains to a process and to a device for testing the function of an electronically controlled brake system having a central control unit with at least one microcomputer and at least two pressure control modules for actuating the brakes.

An electronically controlled brake system in which measures are taken to test the function of the brakes is known from the publication Elektronischgeregelte Druckluftbremsanlage für Nutzfahrzeuge, Fisita 1992, by J. Wrede, W. Stumpe, I. Grauel, J. Bräuninger, A. Schlichenmaier, and H. Kächele. The brake system described in this document comprises a central control unit, in which two redundant microcomputers are provided. So-called "pressure control modules" are provided to act on the wheel brakes. These modules carry out the function not only of pressure control valves but also of microcomputers. The microcomputers control the pressure in the wheel brake to which it is assigned and also accept the input of sensor signals. The central control unit is connected to the microcomputers of the pressure control modules by way of a communications system, e.g., CAN, so that information and data can be exchanged. Several different measures are provided to test the functions of the brake system. For example, the microcomputers and their memory units perform self-tests; the microcomputers of the pressure control modules are also monitored by the central control unit by way of communications data. The redundant microcomputers in the central control unit also monitor each other. The microcomputers of the pressure control modules, furthermore, check the connecting lines of the various pressure control modules to see if there are any breaks, short circuits, or undervoltages. In addition, they carry out plausibility tests during the braking process. If an error is detected, emergency functions are initiated, which leads to the shut-down of partial functions or to the shut-down of the entire electrical system. The brake system is then controlled by the emergency pneumatic brake circuit or circuits. Because only one microcomputer with an analog-digital converter (ADC) is provided in each pressure control module, it is not possible to run a reliable test of the function of these analog-digital converters by means of the known measures. The installation of redundant microcomputers in the pressure control modules, however, would be unreasonably expensive.

An electronically controlled brake system in which the pressure sensors assigned to the individual wheel brakes are calibrated by the input of defined pressure values before the vehicle is driven is known from DE-OS 34 16 744.

SUMMARY OF THE INVENTION

To carry out function testing of an electronically controlled brake system, the brake actuation control units detect a common operating variable and transmit it to a central control unit, where a fault is identified when the operating variable deviates unacceptably from a reference variable.

The function testing according to the invention improves the operational reliability of an electronically controlled brake system.

It is especially advantageous that, in a control system with distributed intelligence, it is possible, without any additional effort, to recognize not only defects in the function of the analog-digital converters but also additional fault conditions such as increased transfer resistances in the cabling, short circuits and breaks in the lines leading to the individual control units, defective sensors, etc.

It is especially advantageous for the function tests to be carried out before the vehicle equipped with the brake system is driven, preferably in conjunction with the calibration of the pressure sensors.

DESCRIPTION OF THE EXEMPLARY EMBODIMENTS

Figure 1:
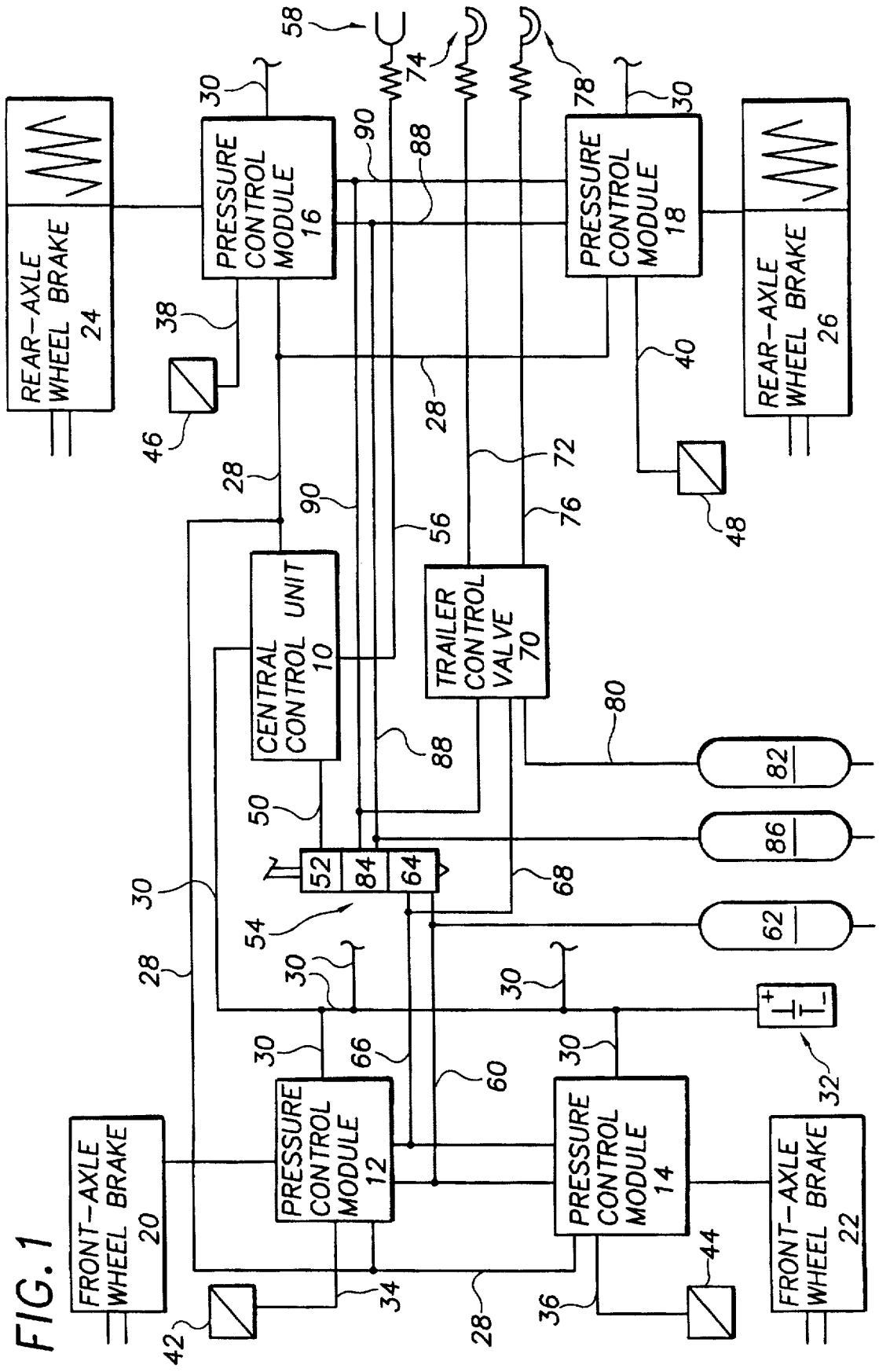
FIG. 1 is a block circuit diagram of the overall electronically controlled brake system, based on the example of an electronically controlled compressed air brake system.

FIG. 1 shows a block circuit diagram of the entire electronically controlled brake system, namely, an electronically controlled compressed air brake system by way of example, with emergency brake circuits for a two-axle vehicle with a trailer hitch.

FIG. 1 shows a central control unit 10, which has at least two micro-computers. In addition, so-called pressure control modules 12, 14, 16, 18 are provided decentrally, each of which is assigned to a respective wheel brake 20, 22, 24, 26, of the vehicle. Central control unit 10 is connected by way of a communications system 28, e.g., CAN, to pressure control modules 12, 14, 16, 18. Central control unit 10 and pressure control modules 12–18 are supplied with operating voltage by a voltage source 32 and a system of lines 30. To detect the brake pressures which have been produced and possibly other variables as well, such as the axle loads, the rpm's of the wheels, etc., lines 34, 36, 38, 40 lead from appropriate measuring devices 42, 44, 46, 48, respectively, to pressure control modules 12–18. Central control unit 10 is also connected by way of a line 50 to the electrical section 52 of a brake value transmitter 54. To control the brake system of a trailer, furthermore, a line 56 leads from central control unit 10 to an electrical plug 58, to which the trailer is connected.

In the system shown in FIG. 1, the pneumatic section of the brake system consists of two brake circuits, one for the front axle and one for the rear axle. For this purpose, pressure control modules 12, 14 assigned to the wheel brakes 20, 22 of the front axle are supplied via lines 60 with a feed pressure originating from an accumulator 62. Control lines 66 pass from first pneumatic section 64 of the brake value transmitter to pressure control modules 12, 14. In addition, a line 68 leads from line 66 to a trailer control valve 70 for the control of the brake system of the trailer. A pneumatic control line 72 leads from trailer control valve 70 to a first coupling head 74. A feed line 76 leads to a second coupling head 78. In addition, the trailer control valve is also connected by a line 80 to accumulator 82. The second brake circuit is formed by a second pneumatic section 84 of brake value transmitter 54, accumulator feed line system 88, and pneumatic control line system 90. Feed lines 88 and control lines 90 lead from brake value transmitter 54 to pressure control modules 16, 18 assigned to wheel brakes 24, 26 of the rear axle.

In a preferred exemplary embodiment, a value for determining the degree to which the brake pedal has been actuated is sent to central control unit 10 by electrical section 52 of brake value transmitter 54. This signal is processed by the central control unit, and nominal values are determined in accordance with predefined characteristic curves or characteristic fields, possibly under consideration of additional operating variables such as axle loads, wheel-specific variables, vehicle deceleration, etc., or nominal pressure moments, nominal braking moments, or nominal slippage values for the individual wheel brakes or for the trailer. These nominal values are sent via communications system 28 to the individual pressure control modules, which adjust the pressure in the individual wheel brakes in correspondence with the prescribed nominal value. If a defect develops in the electrical section of the brake system, this section or at least the defective part (e.g., the front or rear axle) is turned off, and the pneumatic emergency brake circuit or circuits are turned on. Under emergency operating conditions, the driver prescribes the wheel braking pressure in the individual wheel brakes by means of pneumatic sections 64, 84 of brake value transmitter 54 by way of control lines 66, 90, respectively, and this pressure is produced in the wheel brakes by the pressure control modules while the electrical actuation remains inactive.

The function test according to the invention described below can be used advantageously not only for the brake system shown in FIG. 1 but also for electric-pneumatic brake systems of other design or for electric-hydraulic brake systems or for brake systems in which the brakes are actuated purely by electric power. The essential point is that the control system of the brake system in question has distributed intelligence; that is, at least one central microcomputer and at least two microcomputers, assigned to the wheels of the vehicle (and possibly installed locally) for controlling the brake system, are provided.

To test the function of the brake system, an operating variable which can be detected by all units and which has essentially the same value at the locations of the pressure control modules and/or the central control unit is read into the microcomputers of the pressure control modules 12, 14, 16, 18 and, in a preferred exemplary embodiment, into the microcomputers of the central control unit; this value is then sent on via communications system 28 to the central control unit 10. A suitable parameter which can be read into the pressure control modules and the two microcomputers of the central control unit for the function test has been found to be the operating voltage sent to the individual control units. This is read into the microcomputers of the pressure control modules in any case to compensate for the influence of variations in the operating voltage on the pick-up and drop-out times of the armatures of the magnetic valves. Another suitable parameter is the braking pressure produced in the wheel brakes for the purpose of calibration. In this case, the operating variable is read only into the microcomputers of the pressure control modules.

For the function test, at least one of the microcomputers of the central control unit receives the values for the operating variable determined by the pressure control modules. This microcomputer then forms a reference variable, with which it compares the individually measured operating variables determined by the pressure control modules. If there is an unacceptable deviation between the reference variable and the value for the operating variable which it has received, it is assumed, in cases where the operating voltage is being detected, that there is a defect in the analog-digital converter of the associated pressure control module or a defective state involving the line which feeds voltage to this pressure control module. In cases where it is the brake pressure which is being detected, it is assumed in a corresponding manner that there is a defect in the route used to detect the pressure. If a defect is identified, the brake system is switched over to emergency operating mode. That is, the electrical system is turned off in whole or in part, and part or all of the brake system is switched over to pneumatic or hydraulic emergency actuation.

It has been found that the best procedure for obtaining the reference variable in the central control unit differs from one exemplary embodiment to another. In cases where the operating voltage is detected for the purpose of the function test, measured operating voltage values are available in each of the two microcomputers of the central control unit; these values are then tested by the two microcomputers. For example, the two values can be compared with each other in each microcomputer on the basis of a certain tolerance range. If the two operating voltage values are in agreement within the tolerance range, then one of the operating voltage values, a mean value, a maximum value, or a minimum value is used in at least one of the microcomputers as the reference variable. If the two operating voltage values differ from each other to an unacceptable degree, it can be assumed that there is a problem with the electrical control system.

In another embodiment, the mean value, the maximum value, or the minimum value is calculated from the measured values of the brake pressure or the operating voltage read into the pressure control modules. This mean, maximum, or minimum value is then used as the reference variable. A fault is assumed if one of the received operating values deviates to an unacceptable degree from the reference variable. In cases where maximum or minimum values are used as reference variables, it can occur that all of the measured values deviate unacceptably from the reference variable. In this case, it is necessary to assume an error state in the area of the pressure control module which is detecting the reference variable.

In cases where the operating voltage is detected, certain deviations can be tolerated. These result from differences in the power demand of the individual pressure control modules, from tolerances in the electrical components such as the resistance voltage dividers, from tolerances in the individual analog-digital converters, from tolerances in the reference voltages of the individual converters, and from differences in the transfer resistances of the plug connectors and cables of the pressure control modules and the central control unit. When the deviation between the measurement value in question and the reference variable is being tested, a tolerance range must be provided which takes these deviations into consideration. Appropriate tolerances are also to be taken into consideration when measured pressure values are used.

In an advantageous exemplary embodiment, it has been found suitable for the function test to be carried out in parallel in the two microcomputers of the central control unit. In this case, the results of the tests of the two computers can then be compared with each other, and thus the reliability of the function test is further increased. If the results do not agree, operations must be switched over to emergency mode.

Figure 2:
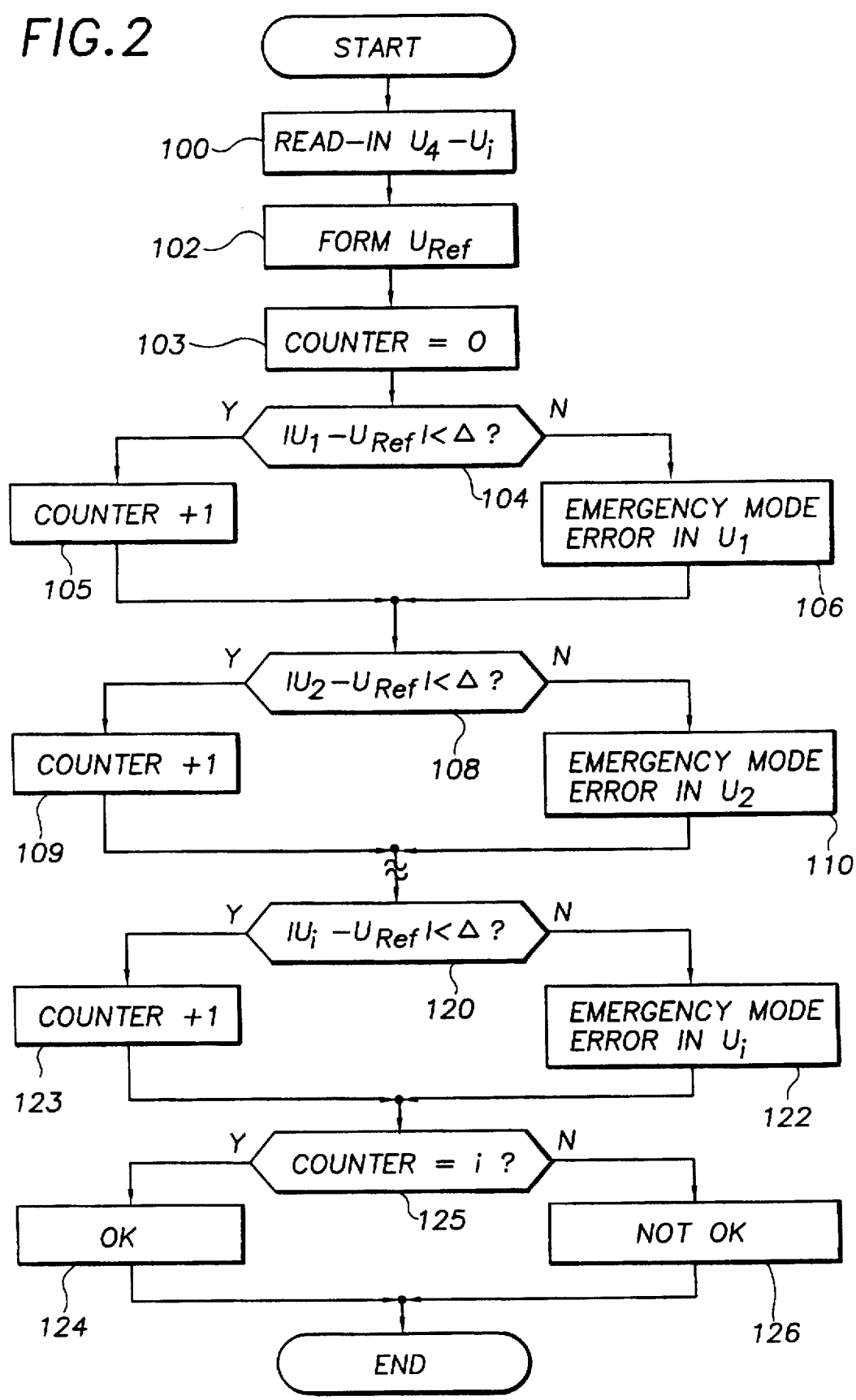
FIG. 2 is a flow chart illustrating how the function testing according to the invention can be implemented.

FIG. 2 shows a flow chart which illustrates an exemplary embodiment of a function test program running on one of the microcomputers.

When the specified time has arrived for the program section shown in FIG. 2 to start, the measurement values $U_1$–$U_i$ from the individual pressure control modules are read into the central control unit (where i=1, 2, ... n) in step 100. In the following step 102, the reference value $U_{ref}$ is formed in the microcomputer running this section of the program in the manner described above. In step 103, a counter is set to zero. Then, in interrogation step 104, the program asks whether the value of the difference between measurement value $U_1$ and reference value $U_{ref}$ is smaller than a predetermined tolerance value $\Delta$. If this is not the case, an unacceptable deviation of measurement value $U_1$ from reference value $U_{ref}$ is recognized; an error in the area of the pressure control module transmitting measurement value $U_1$ is identified in step 106, and emergency operating measures are possibly initiated. If an unacceptable deviation is not found, the counter is increased by 1 in step 105. After step 105 or 106, step 108 is carried out, in which the value of the difference between the second measurement value $U_2$ and the reference value is formed and compared with the predetermined tolerance value $\Delta$. If the value of the difference exceeds the tolerance value, then, in the same way as in step 106, the pressure control module transmitting value $U_2$ is identified as defective in step 110, and emergency operations are possibly initiated. If there is no unacceptable deviation, in step 109 the counter is increased by 1 again. All of the values being read in are compared with the reference value in the same way. For example, step 120 shows the comparison between the tolerance value and difference between the arbitrary measurement value, and the reference value. If the answer is "no", a fault is identified in step 122 and emergency measures may be initiated. If the answer is "yes", the counter is increased by 1 (step 123). After step 122 or 123, the counter status is compared in step 125 with value i, which corresponds to the number of modules which have been tested. If the counter status is the same as value i, the system is acknowledged as fully functional after step 124. If, therefore, no error has been determined in any of the interrogations, the functionality of the brake system has been established, and this section of the program is terminated. If the counter status is not equal to value i, in step 126 the system is assumed to be nonfunctional, and this section of the program is terminated.

The structure of the program can be modified, depending on how the emergency mode operates. If, for example, only one type of emergency operation is provided after the electrical system has been shut down, the program section can be terminated as soon as it has identified a first defect. If emergency operating modes are provided for each of the individual brake circuits, then, if a defect occurs in one of the brake circuits, there is no need to continue comparing values in this particular circuit. This does not apply if it is suspected that there is an error in the reference value itself.

In an advantageous exemplary embodiment, the tolerance value $\Delta$ is selected to be equal for all pressure control modules. This will be done especially in cases where all the pressure control modules are essentially of the same design and have essentially the same tolerance values. But if pressure control modules of different designs or tolerances are used, the tolerance values will be defined differently for each measurement signal or group of measurement signals.

It is possible to use the brake pressure as the test variable for testing the function of the brake system, but in other exemplary embodiments it has been found suitable to use other variables such as the braking moment, the braking power, or the braking force, which describe the braking action produced at the individual wheel.

In addition to the error checking which is carried out in the central control unit, it is provided in other advantageous embodiments that error checking can also be carried out in the manner described in one of the pressure control modules as well.

What is claimed is:

1. Method for testing the functioning of an electronically controlled brake system in a vehicle having a central control unit, brakes at individual wheels, and brake actuation control units associated with the respective brakes of at least one wheel on each axle of the vehicle, each brake actuation control unit comprising a microcomputer, said method comprising measuring an operating variable by means of each said brake actuation control unit, transmitting the measured values of the operating variables to said central control unit, forming a reference variable in said central control unit based on at least one of said operation variables measured by the brake actuation control units, comparing each operating variable with said reference variable in said central control unit, and identifying a fault associated with the respective control unit when the respective operating variable deviates from the reference variable by more than a predetermined tolerance value.

2. Process according to claim 1, wherein the brake action control units are pressure control modules assigned to the wheel brake cylinders.

3. Process according to claim 1 wherein the operating variable is one of operating voltage, brake pressure produced in the wheel brake cylinders, braking moment produced, brake power produced, and braking force produced.

4. Process as in claim 3 wherein said operating variable is the operating voltage of brake actuation control units.

5. Process according to claim 1 wherein the reference variable is formed by the mean, the maximum, or the minimum of the values for the operating variable which have been received.

6. Process according to claim 1 wherein the central control unit comprises at least two redundant microcomputers, both of which detect the operating voltage and, if the voltage has been detected without error, derive the reference variable from the measured values.

7. Process according to claim 1 further comprising turning off at least some of the electronic control of the brake system when a fault is identified.

8. Process according to claim 1 wherein the brake system is one of a pneumatic brake system, a hydraulic brake system, or a brake system in which the brakes are actuated by electric power.

9. Process according to claim 1 wherein the functioning is tested before the vehicle is driven as part of a "pre-drive check".

10. Process as in claim 9 wherein the functioning is tested at the beginning of a trip, the first time that a given speed is reached.

11. Method as in claim 1 wherein said brake actuation control units are associated with the respective brakes of each wheel of the vehicle.

12. Apparatus for testing the functioning of an electronically controlled brake system in a vehicle having brakes at individual wheels, said apparatus comprising brake actuation control units associated with the respective brakes of at least one wheel on each axle of the vehicle, each brake actuation control unit having a microcomputer, each brake actuation control unit comprising measuring means which measures an operating variable available at the respective wheel, and transmitting means which transmits the measured operating variables, a central control unit which receives the operating variables transmitted by the brake actuation control units, forms a reference variable based on at least one of said operating variables, compares said operating variables to said reference variable, and identifies a fault associated with the respective control circuit when a respective operating variable deviates from said reference variable by more than a predetermined tolerance value.

13. Apparatus for controlling the brakes of a vehicle, said apparatus comprising brake pedal means actuated by a driver, a central control unit for generating nominal values for control of said brakes based on the degree of actuation of said brake pedal, brake actuation control units associated with the brakes of at least one wheel on each axle of the vehicle, each brake actuation control unit having a microcomputer, each brake actuation control unit measuring the operating voltage of the brake actuation unit, sending the measured value of the operating voltage to the central control unit, and adjusting the operating variable based on the respective nominal value, said central control unit further comprising means for forming a reference value based on at least one of said operating voltage values measured by the brake activation control units, and comparing said operating voltage values to said reference value, means for identifying a fault associated with the respective control unit when said operating voltage value deviates from said reference value by more than a predetermined tolerance value, and a brake value transmitter which initiates an emergency mode of brake control when a fault is detected.

14. Apparatus as in claim 13 wherein said brake value transmitter imitates an emergency mode by making the brakes directly responsive to the brake pedal.

15. Method as in claim 13 wherein said brake actuation control units are associated with the respective brakes of each wheel of the vehicle.

16. Apparatus as in claim 13 wherein said brake actuation control units are associated with the respective brakes of each wheel of the vehicle.

* * * * *

UNITED STATES PATENT AND TRADEMARK OFFICE
CERTIFICATE OF CORRECTION

PATENT NO. : 5,717,134

DATED : FEBRUARY 10, 1998

INVENTOR(S) : SCHLICHENMAIER et al.

It is certified that error appears in the above-identified patent and that said Letters Patent is hereby corrected as shown below:

On the cover, in the title, line 3, change "CONTROLLING" to -- CONTROLLED --.

In column 1, line 3, change "CONTROLLING" to -- CONTROLLED --.

Signed and Sealed this

Fourth Day of July, 2000

Attest:

Q. TODD DICKINSON

*Attesting Officer*          *Director of Patents and Trademarks*